UNITED STATES PATENT OFFICE.

JAMES F. RICHARDS, OF TITUSVILLE, PENNSYLVANIA, ASSIGNOR OF ONE-HALF TO HENRY BADCOCK, OF SAME PLACE.

COMPOUND FOR COATING DRY-SAND MOLDS AND CORES.

SPECIFICATION forming part of Letters Patent No. 276,628, dated May 1, 1883.

Application filed February 24, 1883. (No specimens.)

To all whom it may concern:

Be it known that I, JAMES FINLEY RICHARDS, of Titusville, in the county of Crawford and State of Pennsylvania, have invented a new and useful Improvement in Compounds for Dry-Sand Molds and Cores; and I do hereby declare that the following is a full, clear, and exact description thereof.

My invention relates to an improvement in compounds for coating dry-sand cores and molds; and it consists of the combination of plumbago, wood-charcoal, bituminous coal, malt liquor, flour, and water, compounded in the manner hereinafter described.

About equal parts, by weight, of the plumbago, wood-charcoal, and bituminous coal are thoroughly pulverized and sifted through a very fine sieve or "dust-bag," said ingredients being thoroughly mixed. A sufficient quantity of malt liquor (common beer) is added to this mixed mass to make it by stirring into a thin paste. Then flour is mixed in water until the flour and water have the consistency of cream.

In preparing a quantity of the compound for "washing" or coating a mold or a core, take three parts of the first mixture and one part of the second mentioned mixture and mix said mixtures thoroughly together, after which add sufficient water to make the mixed mass of the consistency desired.

The compound is applied to the mold or core with a brush, (by preference a very fine brush,) care being taken to apply the compound evenly and uniformly over the surface of the mold or core.

Molds or cores for heavy castings should have two or three coats of said compound, a single coating being sufficient for light castings; but I leave the number of coats to be applied to the molds or cores to the skill and judgment of the molder.

The compound hereinbefore described is adapted to be used on molds and cores for all kinds of castings, steel, cast-iron, copper, zinc, brass, and all the known alloys, and will give to the casting a very smooth and fine surface.

Having thus described my improvement, what I claim is—

In a compound for coating dry-sand molds and cores for castings, the combination of plumbago, wood charcoal, bituminous coal, malt liquor, flour, and water, mixed and prepared substantially as herein described, and for the purpose set forth.

JAMES FINLEY RICHARDS.

Witnesses:
 ARCHIE JOHNSTON,
 HENRY BADCOCK.